US012519232B2

(12) United States Patent
Cao et al.

(10) Patent No.: US 12,519,232 B2
(45) Date of Patent: Jan. 6, 2026

(54) DUAL-BAND FILTERING ANTENNA

(71) Applicants: JIANGSU HENGXIN TECHNOLOGY CO., LTD., Jiangsu (CN); JIANGSU HENGXIN WIRELESS TECHNOLOGY CO., LTD., Jiangsu (CN)

(72) Inventors: Kuigen Cao, Wuxi (CN); Jue Gong, Wuxi (CN); Shu Li, Wuxi (CN); Ping Huang, Wuxi (CN); Jian Sun, Wuxi (CN); Xiaofei Wei, Wuxi (CN)

(73) Assignees: JIANGSU HENGXIN TECHNOLOGY CO., LTD., Wuxi (CN); JIANGSU HENGXIN WIRELESS TECHNOLOGY CO., LTD., Wuxi (CN)

( * ) Notice: Subject to any disclaimer, the term of this patent is extended or adjusted under 35 U.S.C. 154(b) by 60 days.

(21) Appl. No.: 18/602,572

(22) Filed: Mar. 12, 2024

(65) Prior Publication Data

US 2025/0167449 A1 May 22, 2025

Related U.S. Application Data

(63) Continuation-in-part of application No. PCT/CN2023/132847, filed on Nov. 21, 2023.

(30) Foreign Application Priority Data

Nov. 3, 2023 (CN) ......................... 202311454227.9

(51) Int. Cl.

*H01Q 5/385* (2015.01)
*H01P 1/00* (2006.01)
*H01Q 5/20* (2015.01)

(52) U.S. Cl.

CPC ............... *H01Q 5/385* (2015.01); *H01P 1/00* (2013.01); *H01Q 5/20* (2015.01)

(58) Field of Classification Search

CPC ........ H01Q 21/26; H01Q 13/10; H01Q 5/385; H01Q 5/28; H01Q 5/20; H01Q 1/521; H01Q 1/38; H01Q 1/246; H01P 1/00

See application file for complete search history.

(56) References Cited

U.S. PATENT DOCUMENTS

2021/0305722 A1* 9/2021 Zhang .................... H01Q 21/26
2022/0190487 A1* 6/2022 Sun ...................... H01Q 21/062
(Continued)

FOREIGN PATENT DOCUMENTS

CN 209516000 U * 10/2019
CN 113795979 A 12/2021
(Continued)

OTHER PUBLICATIONS

Machine Translation CN113937465B (Year: 2023).*
(Continued)

*Primary Examiner* — Raymond R Chai
(74) *Attorney, Agent, or Firm* — Scully, Scott, Murphy & Presser, P.C.

(57) ABSTRACT

A dual-band filtering antenna is provided, which includes: a base, a set of baluns arranged crosswise on the base, and a first radiation arm and a second radiation arm each connected to one of the set of baluns, where copper foil is printed on front and back sides of the first radiation arm and the second radiation arm, the copper foil is divided into a plurality of small modules, a connection module is further arranged between every two small modules, a C-shaped gap is formed on a front side of each small module, and an inverted L-shaped branch is arranged at an edge of each small module.

9 Claims, 6 Drawing Sheets

(56) References Cited

U.S. PATENT DOCUMENTS

| | | | | |
|---|---|---|---|---|
| 2022/0224004 | A1* | 7/2022 | Wakabayashi | H01Q 13/106 |
| 2023/0094901 | A1* | 3/2023 | Mitsugi | H01Q 9/065<br>343/795 |
| 2024/0178564 | A1* | 5/2024 | Himath | H01Q 21/062 |

FOREIGN PATENT DOCUMENTS

| | | | | | |
|---|---|---|---|---|---|
| CN | 113937465 | A | | 1/2022 | |
| CN | 115701674 | A | | 2/2023 | |
| CN | 113937465 | B | * | 3/2023 | H01Q 21/24 |
| CN | 117578050 | A | * | 2/2024 | H01P 1/20 |
| WO | 2016204821 | A1 | | 12/2016 | |

OTHER PUBLICATIONS

International Search Report and Written Opinion dated Jun. 26, 2025 received in International Application No. PCT/CN2023/132847.

* cited by examiner

DUAL-BAND FILTERING ANTENNA

CROSS-REFERENCE TO RELATED APPLICATION

This application is a continuation-in-part of international application number PCT/CN2023/132847, filed Nov. 21, 2023, which is incorporated herein by reference in their entirety.

TECHNICAL FIELD

The present disclosure belongs to the technical field of filtering antennas, and particularly relates to a novel dual-band filtering antenna.

BACKGROUND

As a key component in a communication system, an antenna is utilized to achieve conversion between guided waves and free-space electromagnetic waves. For a civil mobile communication system, it is necessary to use a base station antenna to achieve information communication and interaction between a base station device and a mobile terminal device. At present, the 5th generation mobile communication (5G) has been commercialized, and the development of mobile communication technology is a continuous enrichment and evolution process, and 5G commercialization does not cause 2G/3G/4G communication systems to withdraw from the network in a short time. Therefore, the 2G/3G/4G/5G communication systems will inevitably coexist and be co-constructed for a long time.

The coverage and deployment of the 5G antenna are large, and if a station is established independently, the shortage of the base station site resources is aggravated, which causes a huge waste of resources and greatly increases the operation cost. To save cost, the 5G base station antennas are integrated with the original 2G/3G/4G base station antennas to achieve multi-band and multi-standard base station antenna fusion. That is to say, signal coverage of multiple network standards can be achieved without additionally increasing the space occupied by base station antenna equipment. This can greatly alleviate the shortage of base station site resources and reduce the operating cost of operators. This has a huge effect on promoting the 5G commercialization process and accelerating the national information modernization construction.

According to this planning assumption, 2G/3G/4G/5G will share a reflector and a radome, which is called a multi-band common-caliber base station antenna. To suppress coupling interference of sub-antenna systems operating in different bands in the same antenna, the filtering antenna technology is widely applied in the field of base station antennas. At present, a primary problem faced by multi-band fusion base station antennas is cross-band coupling suppression. Therefore, multi-band array antenna inter-frequency decoupling technology has become a research hotspot in the field of base station antennas. The present disclosure meets the urgent need of the antenna industry, and designs a dual-band filtering antenna suitable for a multi-band fusion scenario.

The information disclosed in this background section is only intended to enhance understanding of the general background of the present disclosure and should not be considered as an acknowledgment or any form of suggestion that this information constitutes the prior art that is already known to those of ordinary skill in the art.

SUMMARY

A novel dual-band filtering antenna is provided according to an embodiment of the present disclosure, so as to overcome the defects in the conventional technology.

In view of this, the present disclosure provides a novel dual-band filtering antenna, including a base, a set of baluns arranged crosswise on the base, and a first radiation arm and a second radiation arm each connected to one of the set of baluns, wherein copper foil is printed on front and back sides of the first radiation arm and the second radiation arm, the copper foil is divided into a plurality of small modules, a connection module is further arranged between every two small modules, a C-shaped gap is formed on a front side of each small module, and an inverted L-shaped branch is arranged at an edge of each small module.

Further, in an embodiment, the first radiation arm and the second radiation arm have a dielectric constant of 2.0 to 10.0 and a thickness of 0.2 mm to 3 mm.

Further, in an embodiment, the copper foil is provided with a plurality of plated vias, and each of the plurality of plated vias connects the copper foil on a front side and a back side; this form is equivalent to thickening a thickness of a metal on the radiation arm, plays a role in delaying changes in an impedance of the radiation arm and is beneficial to impedance matching.

Further, in an embodiment, the connection module is a module having a structure formed by an upper rectangular shape plus a lower splayed shape and is configured to electrically connect to two adjacent small modules.

Further, in an embodiment, a feed microstrip line is arranged at a front side of the balun, and a metallic grounding is arranged at a back side of the balun.

Further, in an embodiment, an end of the feed microstrip line is provided with a short-circuit plated via, and the short-circuit plated via transmits energy to the metallic grounding of the balun through the metallic grounding.

Further, in an embodiment, two pieces of copper foil are arranged on front side of each of the first radiation arm and the second radiation arm close to a center, a top end of the metallic grounding of each of the set of baluns is connected to the respective two pieces of copper foil through welding, the two pieces of copper foil couple energy fed by the balun to the copper foil on the back side of the respective radiation arm for transmission, and finally radiation is completed.

Further, in an embodiment, the metallic grounding also adopts a copper foil.

Further, in an embodiment, a number of the set of the baluns is two being named a first balun and a second balun, and the first balun and the second balun are orthogonally arranged on the base.

Further, in an embodiment, the antenna is configured to filter out radiation waves in a band from 1710 MHz to 2690 MHz and a band from 3300 MHz to 3800 MHz.

Compared with the conventional technology, an aspect of the present disclosure has the following beneficial effects:

(1) the novel dual-band filtering antenna according to an embodiment of the present disclosure can reduce its own radiation interference and shielding to other civilian communication bands without affecting its own radiation function, and has very high versatility and practicality in multi-band and multi-standard antenna fusion;

(2) the present disclosure creatively integrates a plurality of filtering decoupling technologies on one antenna, which achieves dual-band decoupling and extends the filtering bandwidth.

Figure 1:
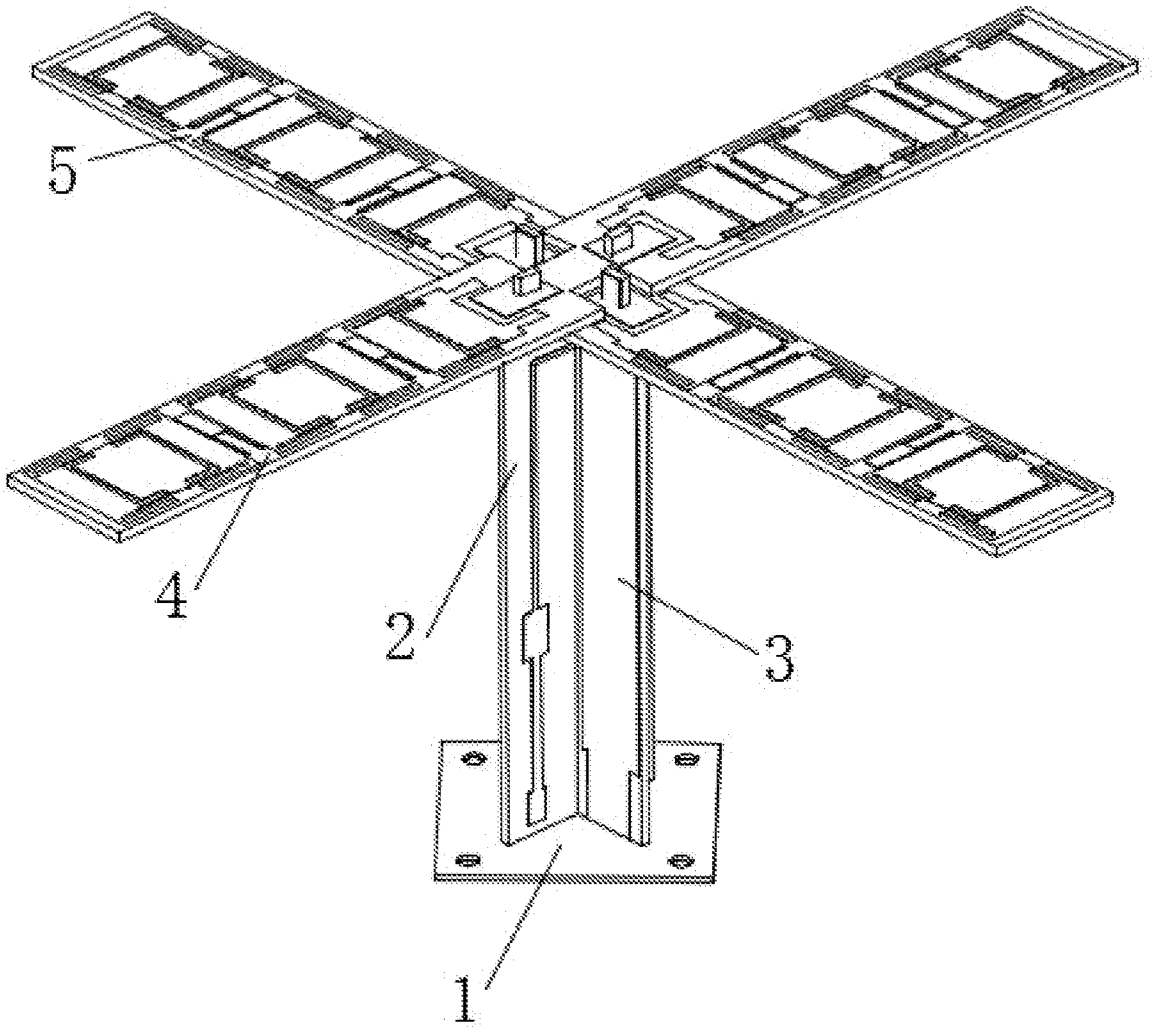
FIG. 1 is an overall schematic diagram of a novel dual-band filtering antenna according to an embodiment of the present disclosure.

Reference numerals: 1: balun base, 2: first balun, 21: first clamping slot, 3: second balun, 31: second clamping slot, 4: first radiation arm, 5: second radiation arm, 6: rectangular feed conductor sheet, 61: press jack, 7: protruded branch, 8: copper foil, 81: plated via, 82: small module, 83: choke, 84: C-shaped gap, 85: inverted L-shaped branch, 10: feed microstrip line, 11/15: metallic grounding, 12: short-circuit plated via, 13: mounting groove, and 14: circular mounting hole.

DETAILED DESCRIPTION

Some embodiments of the present disclosure will be described in detail below. However, it should be understood that the protection scope of the present disclosure is not limited by the illustrated embodiments.

A summary description of one or more aspects is given below to provide a basic understanding of these aspects. This description is not an extensive overview of all contemplated aspects, and is intended to neither identify key or critical elements of all aspects nor define the scope of any or all aspects. The sole purpose of this description is to present some concepts of one or more aspects in a simplified form as a prelude to the more detailed description that is presented later.

Example Embodiment 1

As shown in FIG. 1, a novel dual-band filtering antenna is provided. The antenna includes: a balun base 1 for fixing and support, a first balun 2 and a second balun 3 for feeding which are cross-assembled on the balun base 1, and each of a first radiation arm 4 and a second radiation arm 5 cross-overlapped is arranged on a respective one of the first balun 2 and the second balun 3, and the two radiation arms have the identical structure and are respectively configured for the radiation of two polarizations of the antenna.

Figure 2:
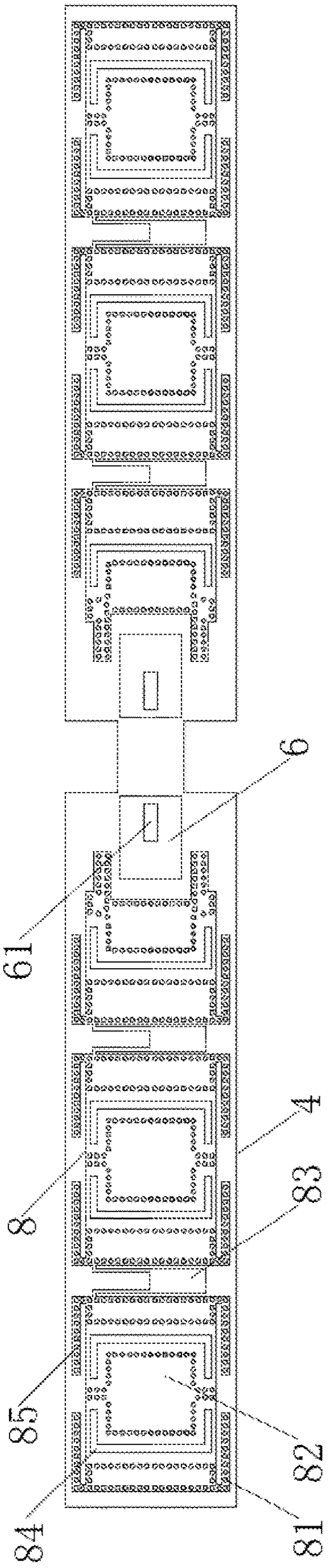
FIG. 2 is a schematic front view of a radiation arm of a novel dual-band filtering antenna according to an embodiment of the present disclosure.
Figure 3:
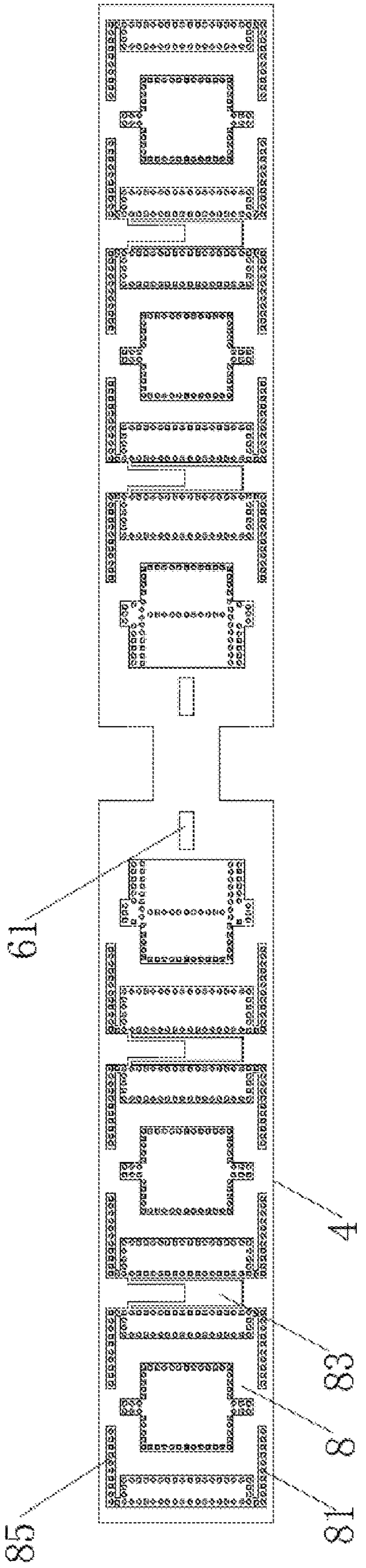
FIG. 3 is a schematic back view of a radiation arm of a novel dual-band filtering antenna according to an embodiment of the present disclosure.
Figure 4:
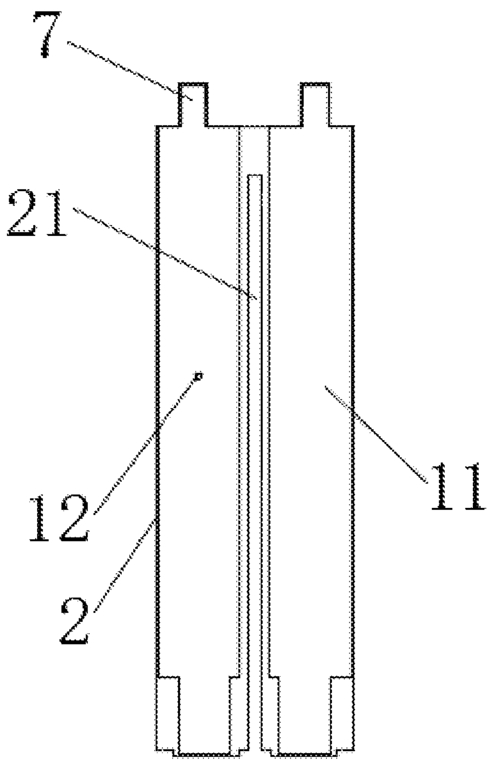
FIG. 4 is a schematic front view of a first balun of a novel dual-band filtering antenna according to an embodiment of the present disclosure.
Figure 5:
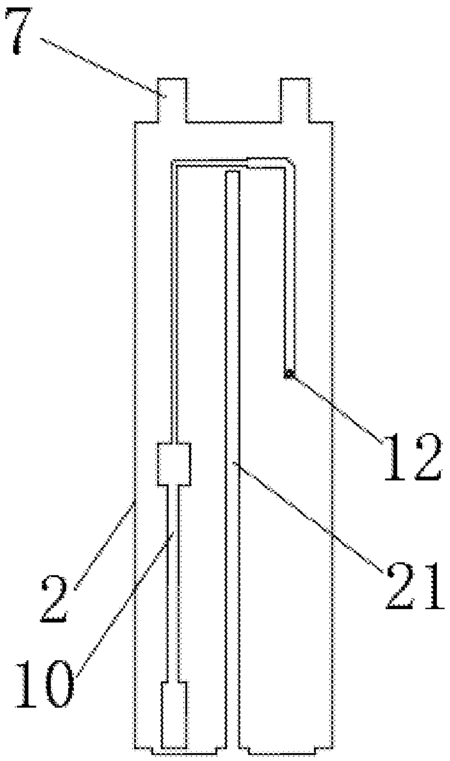
FIG. 5 is a schematic back view of a first balun of a novel dual-band filtering antenna according to an embodiment of the present disclosure.
Figure 6:
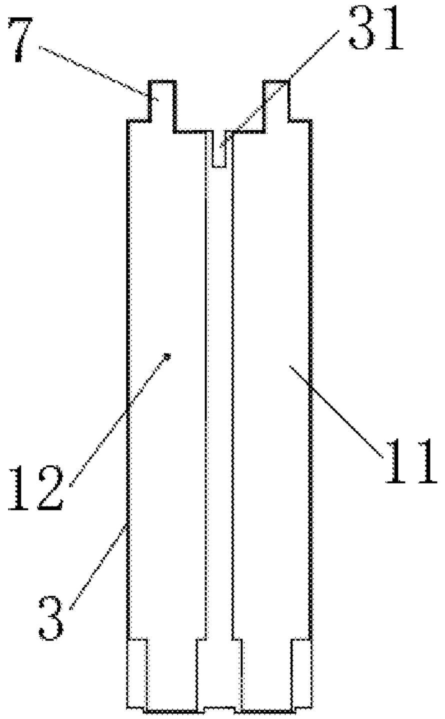
FIG. 6 is a schematic front view of a second balun of a novel dual-band filtering antenna according to an embodiment of the present disclosure.
Figure 7:
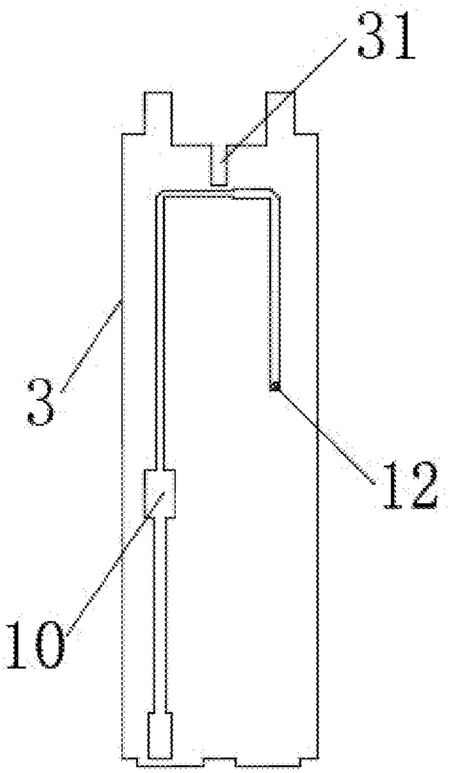
FIG. 7 is a schematic back view of a second balun of a novel dual-band filtering antenna according to an embodiment of the present disclosure.

Specifically, as shown in FIGS. 2 and 3, two rectangular feed conductor sheets 6 for connecting to a top end of the balun are printed on a front side of each radiation arm, a press jack 61 is arranged at the rectangular feed conductor sheet, protruded branches 7 are arranged at tops of both the first balun 2 and the second balun 3, the protruded branches 7 and the respective press jacks 61 are mounted in a matched mode, and the rectangular feed conductor sheets 6 physically play a role in fixing the radiation arms and the baluns.

Copper foil 8 is printed on front and back sides of each radiation arm, a plurality of plated vias 81 (also called vias or plated through holes) are densely arranged on the copper foil 8, and a front-side copper foil and a back-side copper foil are connected through the plated via 81. The copper foil 8 is divided into a plurality of small modules 82, each of which is connected to another module by a choke 83 (i.e., a connection module). As shown in FIGS. 2 and 3, in this example, the choke 83 includes a rectangular connection portion and two elongated connection arms, where each of the two connection arms extends outwards along two sides of the rectangular connection portion, and each of the two connection arms extends toward a respective one of the small modules 82 on two sides respectively at tail ends of the connection arms to connect to corresponding small modules 82; and a width of the rectangular connection portion is slightly smaller than a distance between two adjacent small modules 82, and a width of each of the two connection arms is much smaller than the distance. After the copper foil 8 is separated, the electrical length of the copper foil is changed and diverged from a resonance wavelength of a filtering band; so that an induced current on the radiation arm is small, secondary radiation cannot be formed, thereby the interference of the copper foil to the filtering band is reduced. A current path of the copper foil 8 is also broken after the copper foil is separated, so that the copper foil cannot normally work in the 690 to 960 MHz band. In this case, the choke 83 forms a connection among the small modules, so that the whole radiation arm can be ensured to pass the normal working current of the radiation arm, and the electrical connection effect is achieved. The electrical connection is achieved mainly by coupling, because the choke is very close to the separated small modules, the gap is only around 0.4 mm, and the choke is configured for coupling energy from one small module to another.

The two elongated arms of the choke, i.e., two legs, are configured in such a way that when the radiation waves in the 1710 MHz to 2690 MHz band are irradiated on the radiation arm, the induced currents on the two legs of the choke are reversely offset. This can greatly weaken secondary radiation and once again reduce interference of the choke to the filtering band. A length of the leg of the choke determines the filtering band, and the longer the leg is, the longer the electrical length is, the more the corresponding filtering band moves to a low band. The length of the legs of the choke is generally less than one-eighth of the wavelength of the filtering frequency point. This mode of separating and then connecting through a choke mainly filters out the radiation waves in the 1710 MHz to 2690 MHz band. The choke not only plays a role in electrical connection of the bands of the choke, so that the working current of the choke on the radiation arm is continuous, but also can filter out the induced current of other bands, where the electrical length of the choke determines the filtering band.

The C-shaped gap 84 is etched on the copper foil 8 on the front side of the radiation arm, and the gap 84 can filter out radiation waves in a 3300 MHz to 3800 MHz band. The principle is that when the filtering band antenna irradiates on the radiation arm at a short distance, induced currents on two sides of the C-shaped gap are reversely offset, so that the radiation of the induced currents can be suppressed; a length of the gap C determines a filtering band, and the longer the gap C is, the lower the filtering band is; and a length of the gap C is about a quarter of the wavelength of the filtering frequency point.

The edges of copper foil 8 on the front and back sides of the radiation arm are provided with inverted L-shaped branches 85, and the branches 85 are also configured to filter out radiation waves in a 3300 MHz to 3800 MHz band. The principle is that induced currents on the inverted L-shaped branches 85 and induced current on a copper foil main body on the radiation arm can be reversely offset at a filtering band, so that radiation is suppressed. A length of the inverted-L branch 85 determines a filtering band. The longer the inverted L branch is, the lower the filtering band is; and the length of the inverted-L branch 85 is approximately one-eighth to one-quarter of the wavelength of the filtering frequency point.

As shown in FIGS. 4 to 7, which are schematic diagrams of the first balun 2 and the second balun 3, where the baluns are both provided with protruded branches 7, the first balun 2 is provided with a first clamping slot 21, the second balun 3 is provided with a second clamping slot 31, and the first balun 2 and the second balun 3 are orthogonally nested through the first clamping slot 21 and the second clamping slot 31; a front side of the baluns is provided with a feed microstrip line 10, and a back side of the baluns is provided with a metallic grounding 11; the feed microstrip line 10 is configured for transferring energy fed from a bottom of the balun; a tail end of the feed microstrip line 10 is a short-circuit plated via 12 that is configured for transferring the energy of the feed microstrip line 10 to the metallic grounding 11 on the back side of the balun. After receiving the energy, the metallic grounding 11 finally transfers the energy to a top radiation arm through the rectangular feed conductor sheet 6 to complete radiation. This coupling feed mode can widen the operating bandwidth of the antenna itself and facilitate impedance matching.

Figure 8:
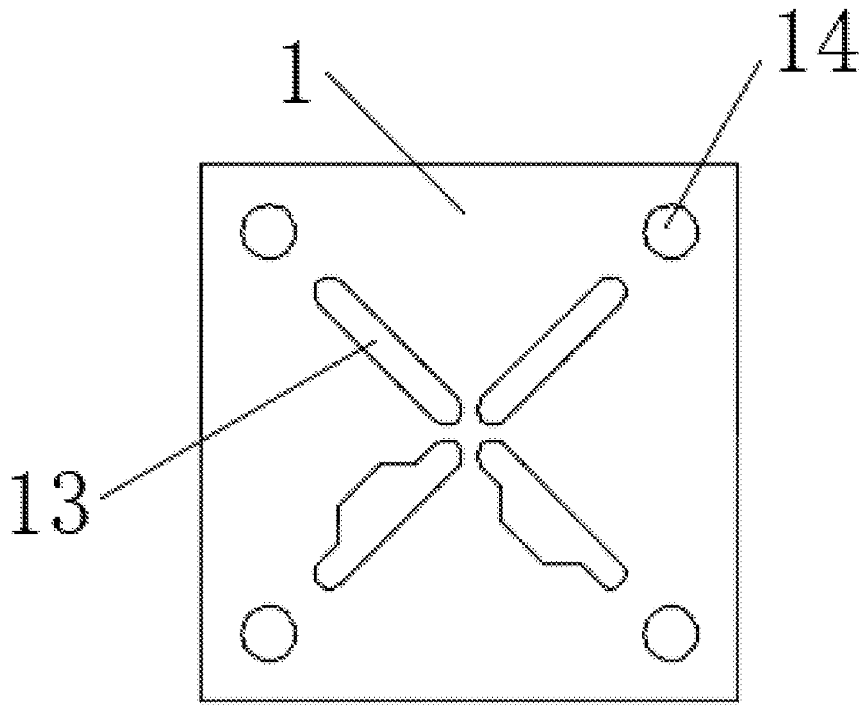
FIG. 8 is a schematic front view of a balun base of a novel dual-band filtering antenna according to an embodiment of the present disclosure.
Figure 9:
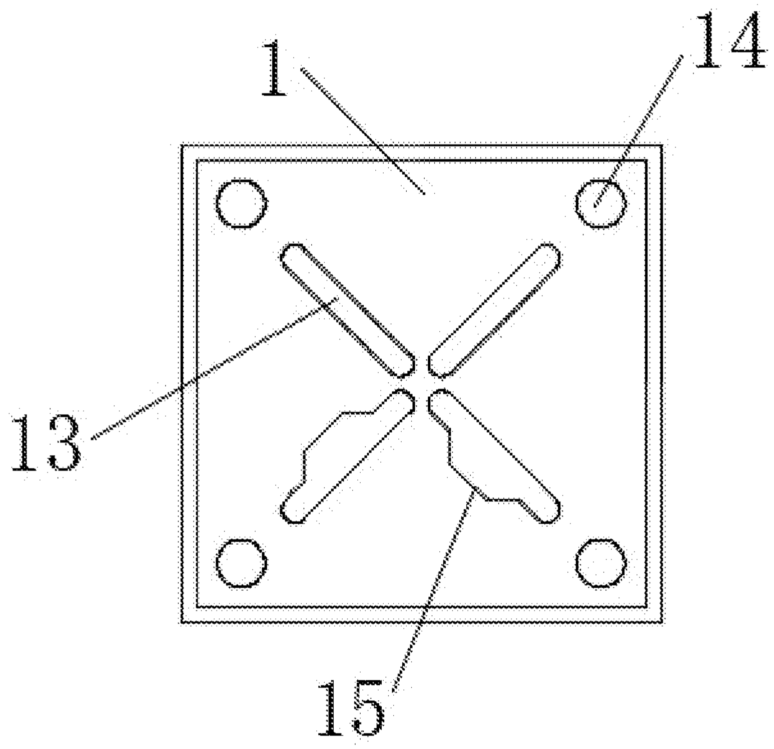
FIG. 9 is a schematic back view of a balun base of a novel dual-band filtering antenna according to an embodiment of the present disclosure.

As shown in FIGS. 8 and 9, which are schematic diagrams of front and back sides of the balun base 1, where four approximately rectangular mounting grooves 13 and four circular mounting holes 14 are formed in the balun base 1, a metallic grounding 15 is also printed on the back side, the bottoms of the first balun 2 and the second balun 3 are inserted into the mounting grooves 13, and the mounting grooves 13 can prevent the feed microstrip line 10 from being short-circuited with the metallic grounding 15 on the back side of the balun base 1; the metallic grounding 11 on the back side of the balun is welded with the metallic grounding 15 on the back side of the balun base 1, so that the balun is mounted and fixed physically, and the effect of balanced feed is achieved in performance; and the circular mounting hole 14 is configured to mount and fix an antenna by a fixing member such as a rivet.

In an embodiment, two pieces of copper foil are arranged on front sides that are of the first radiation arm 4 and the second radiation arm 5 and that are close to a center, top ends of the metallic groundings 11 of the first balun 2 and the second balun 3 are connected to the two pieces of copper foil through welding, the two pieces of copper foil couple energy fed by the first balun and the second balun to the copper foil on the back side of the radiation arm, and finally radiation is completed. It should be noted that the two pieces of copper foil are the rectangular feed conductor sheet 6 described above, which is also a part of the copper foil of the radiation arm, and the copper foil is explained separately because the metallic grounding and radiation arms of the balun need to be welded and connected to transmit energy, and the welding point is the rectangular feed conductor sheet 6. In addition, after the energy transferred from the metallic grounding of the balun reaches the rectangular feed conductor sheet 6, the rectangular feed conductor sheet 6 will couple the energy to the copper foil on the back side of the radiation arm for radiation. Transferring energy through such coupling can widen the operating bandwidth of the antenna. This is also a common feed method for widening the bandwidth in the antenna field.

In this embodiment, the operating band of the antenna itself is 690 MHz to 960 MHz. The antenna can reduce its own radiation interference and shielding to other civilian communication bands without affecting its own radiation function, and has very high versatility and practicality in multi-band and multi-standard antenna fusion; in addition, the present disclosure creatively integrates a plurality of filtering decoupling technologies on one antenna, which achieves the dual-band decoupling and extends the filtering bandwidth.

The foregoing description of some embodiments of the present disclosure has been presented for the purposes of illustration and description. These descriptions are not intended to limit the disclosure to the precise form disclosed, and obviously many modifications and variations are possible in light of the above teachings. The example embodiments are selected and described to explain certain principles of the present disclosure and practical applications thereof. This enables those skilled in the art to implement and use various example embodiments of the present disclosure as well as various selections and modifications. The scope of the present disclosure is intended to be defined by the claims and their equivalents.

What is claimed is:

1. A dual-band filtering antenna, comprising: a base, a set of baluns arranged crosswise on the base, and a first radiation arm and a second radiation arm each connected to one of the set of baluns, wherein copper foil is printed on front and back sides of the first radiation arm and the second radiation arm, the copper foil is divided into a plurality of small modules, a connection module is arranged between every two small modules, a C-shaped gap is formed on a front side of each small module, and an inverted L-shaped branch is arranged at an edge of each small module, wherein induced currents on the inverted L-shaped branches and induced current on a main body of the copper foil on the radiation arm are reversely offset at a filtering band, thereby filtering out a band from a 3300 MHz to 3800 MHZ.

2. The dual-band filtering antenna according to claim 1, wherein the copper foil is provided with a plurality of plated vias, and each of the plurality of plated vias connects the copper foil on the front side and the back side.

3. The dual-band filtering antenna according to claim 1, wherein the connection module comprising a rectangular connection portion and two elongated connection arms is configured to electrically connect to two adjacent small modules, wherein each of the two elongated connection arms extends outward along two sides of the rectangular connection portion, and extends toward a respective one of the two adjacent small modules at a tail end of the elongated connection arm to electrically connect the respective one of the two adjacent small modules.

4. The dual-band filtering antenna according to claim 1, wherein a feed microstrip line is arranged at a front side of each of the set of baluns, and a metallic grounding is arranged at a back side of each of the set of baluns.

5. The dual-band filtering antenna according to claim 4, wherein an end of the feed microstrip line of each of the set of baluns is provided with a short-circuit plated via, and the short-circuit plated via penetrates through the corresponding balun and connects to the metallic grounding on the back side of the corresponding balun.

6. The dual-band filtering antenna according to claim 4, wherein two pieces of copper foil are arranged on the front side of each of the first radiation arm and the second radiation arm close to a center, and a top end of the metallic grounding of each of the set of baluns is connected to the respective two pieces of copper foil.

7. The dual-band filtering antenna according to claim 4, wherein the metallic grounding adopts copper foil.

8. The dual-band filtering antenna according to claim 1, wherein the set of the baluns comprise a first balun and a second balun, and the first balun and the second balun are orthogonally arranged on the base.

9. The dual-band filtering antenna according to claim 3, wherein the antenna is further configured to filter out radiation waves in a band from 1710 MHz to 2690 MHz.

* * * * *